Sept. 27, 1960

J. R. FURRER ET AL 2,953,994

RAILWAY CAR TRUCK

Filed Jan. 23, 1957

INVENTORS
John R. Furrer
Gerd Runken

BY

*Robert A. Shields*

ATTORNEY

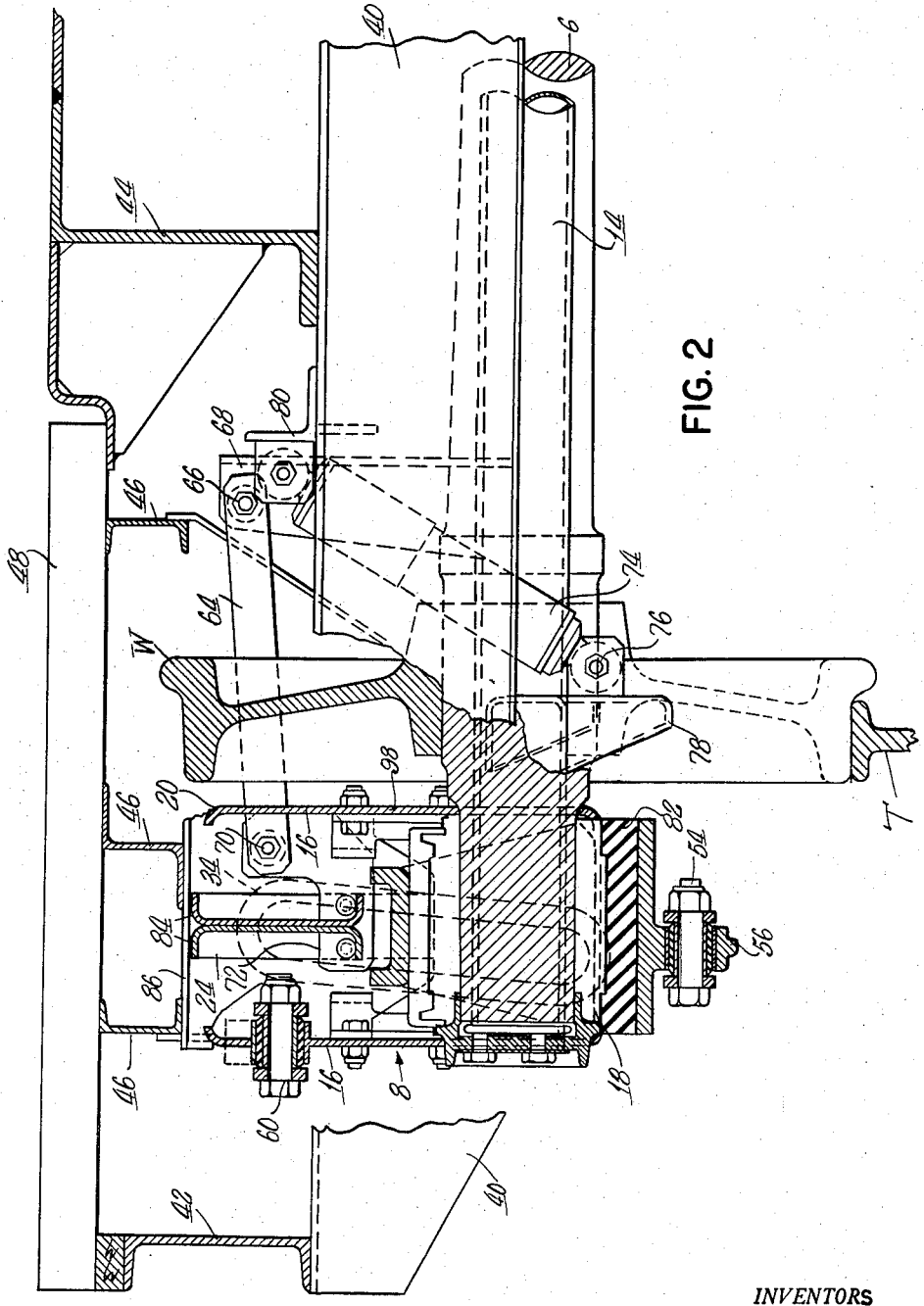

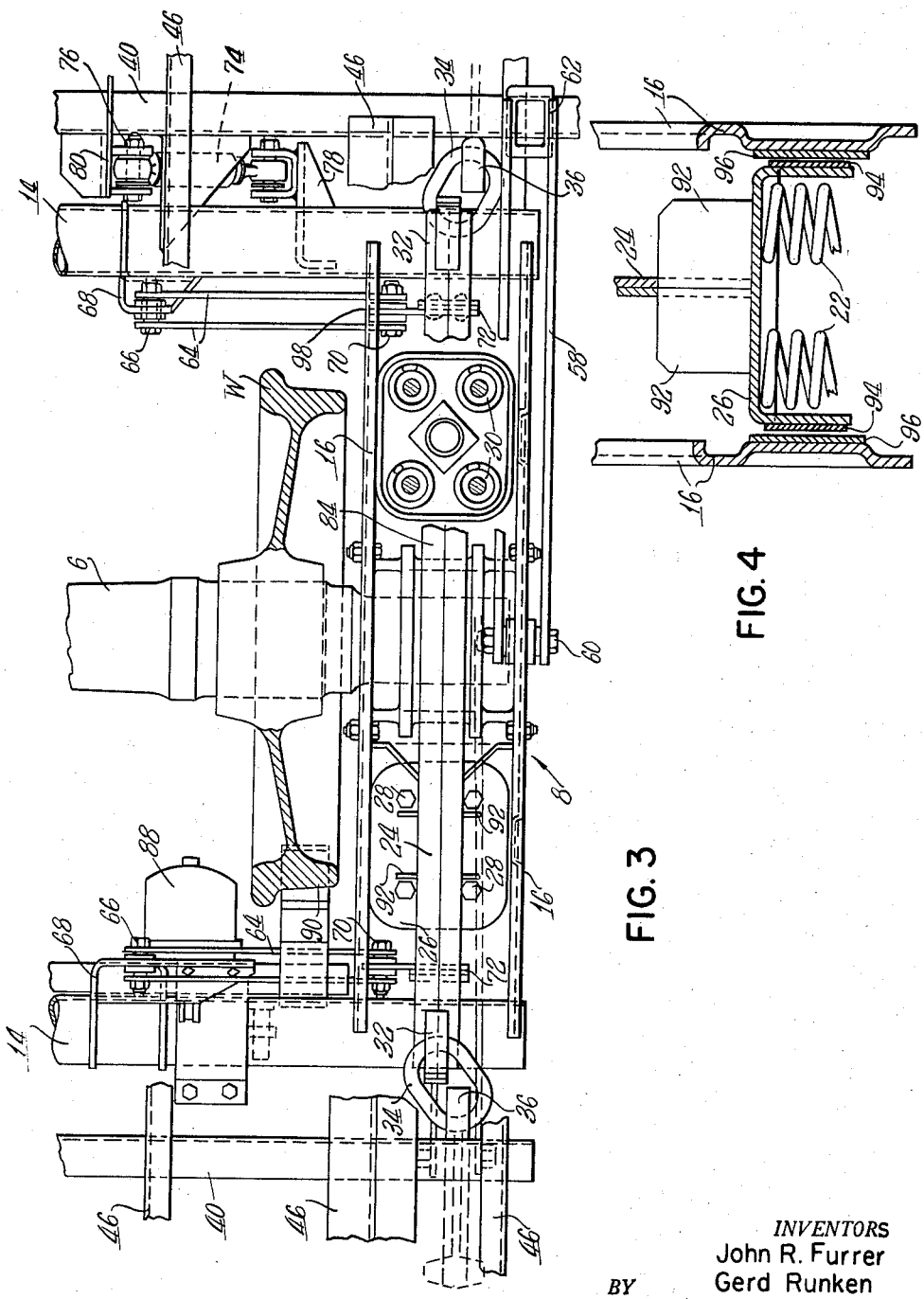

United States Patent Office 2,953,994
Patented Sept. 27, 1960

2,953,994
RAILWAY CAR TRUCK

John R. Furrer, Bronxville, and Gerd Runken, Cold Spring, N.Y., assignors to ACF Industries, Incorporated, New York, N.Y., a corporation of New Jersey Filed Jan. 23, 1957, Ser. No. 635,654

7 Claims. (Cl. 105—157)

This invention relates to vehicle trucks and particularly to a light-weight truck for light-weight railway cars.

Because of its relatively excessive weight and high center of gravity, the standard four-wheel bolster-type truck is unsuitable for light-weight railway car service. A satisfactory truck for such service requires not only light weight and strong construction, but also a low center of gravity to provide the desired stability and riding qualities inherent in the standard type truck due to its heavy construction.

It is an object of the present invention to provide an improved light-weight truck of the bolsterless type.

Another object of the invention is the provision of a two-wheel truck of the suspension type having a low center of gravity and the desired qualities mentioned above.

Still another object of the invention is to provide a truck as above described in which the car body is supported from hangers carried by resiliently mounted parts of divided side frames.

A further object of the invention is to provide a light-weight truck of the type described in which the body supporting guide frame parts are guided by axle-supported side frame parts to impart increased stability to the truck.

These and other objects of the invention will be apparent to those skilled in the art from the following description taken with the accompanying drawings in which:

Fig. 2 is a cross sectional view taken on line 2—2 of Fig. 1 and showing one side of the truck;

Fig. 3 is a partial top plan view of the truck with the wheel shown in section, and Fig. 4 is a sectional view taken on line 4—4 of Fig. 1.

Figure 1:
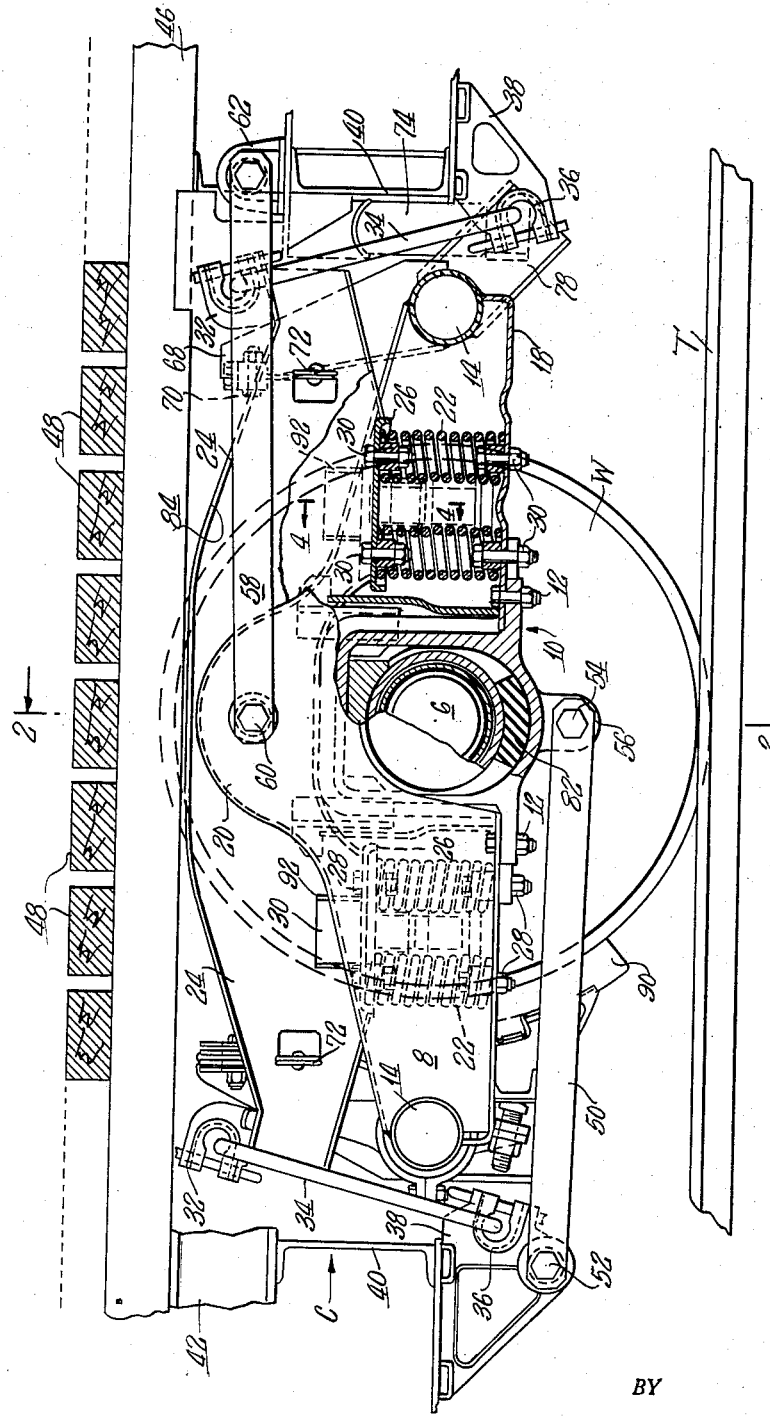
Figure 1 is a side view of the truck with a portion of the side frame broken away to more clearly disclose other parts.

Referring now more in detail to the drawings, the truck comprises a single axle 6 on which are fixed wheels (only one of which is shown) W running on a track indicated at T. Divided side frames including lower side frames 8 are mounted on the axle 6 outwardly of the wheels W by means of suitable journal bearing assemblies generally indicated at 10, being secured thereto by bolts 12. These lower side frames 8 are connected together at their ends by end members 14, shown as tubular or cylindrical in form for purposes of illustration only since they may be of any other suitable or desired shape. As more clearly shown in Fig. 2, the lower side frames 8 are channel shaped in cross section with side walls 16 and a bottom wall 18, the side walls each having an upper arched portion indicated at 20 in Fig. 1.

Resiliently mounted on the lower side frames 8 by spiral or helical spring groups 22 at opposite sides of the truck are upper side frame or car body support members 24. The spring groups 22 are interposed between the lower and upper side frames 8, 24 at each side of the axle 6, being seated between bottom wall 18 of the lower side frames and spring seat platforms 26 on the upper side frames and secured in position by suitable retaining means 28. 30. Cheeks 32 are provided on the ends of the upper side frames 24 from which are pivotally suspended car body carrying hangers 34 connected at their lower ends with similar trunnion members 36 on brackets 38 depending from the car body generally indicated at C. It will be noted that cheeks 36 engage hangers 34 below the level of the bottom of axle 6, thus contributing to the stability of suspension of car body C. The car structure is only partially shown for purposes of necessary illustration, being a light-weight flat car type having an underframe including cross bearer or sill members 40, side sills 42, center sill 44, floor stringers 46 and floor boards 48.

Relative longitudinal movement between car body and truck is restrained by lower links 50 having one end pivotally connected to the brackets 38 as indicated at 52 and their opposite ends pivoted at 54 to depending lugs 56 on the journal bearing assemblies 10. A pair of similar upper links 58 are pivoted at 60 at one end to the arched portions 20 of outer side walls 16 of the lower or axle-supported side frames 8 with their opposite ends pivoted to upstanding lugs 62 mounted on one of the underframe cross sills 40 of the car body.

The truck is stabilized against excessive relative lateral or rolling motion between the lower and upper side frames 8 and 24 by pairs of oppositely located links 64. These links are pivotally connected at one end as indicated at 66 to upstanding brackets 68 fixed to the tubular end members 14 and at their other ends at 70 to brackets 72 secured to the upper side frame members 24' the latter through spring seats 26 having sliding engagement with inner walls 16 of the lower side frames 8. The links 64 thus cooperate with the slidingly engaged walls 16 in guiding the vertical sliding movement of members 24 relative to members 8. Side sway of the car body is resiliently restrained or limited by shock absorbers 74 pivotally connected at 76 between brackets 78, 80 fixed, respectively, to tubular truck end member 14 and one of the car underframe cross sills 40. Vertical movement of the lower axle-supported side frames 8 relative to axle 6 is cushioned by rubber or similar pads or mats 82 provided in the journal bearing assemblies 10. These pads or mats also lock the bearing in the bearing assembly.

As more clearly shown in Fig. 2, the upper or car body supporting side frames 24 of the truck are formed by a pair of channel-shaped members secured together in back-to-back relation with oppositely directed flanges 84, the top-most portions of which have bearing engagement with wear plates 86 on the floor stringers 46 at the sides of the car. As shown in Fig. 1, the upper side frames are generally arch-shaped and lie in part between the side walls 16 of the channel or pan-shaped lower side frames 8, extending slightly above the arched portions 20 thereof. The truck is equipped with suitable brake rigging including a brake cylinder 88, brake shoes 90, etc.

As shown in Fig. 4, portions of the upper side frames 24 are cut away over the spring groups 22 and bent to provide oppositely directed flanged or plate portions 92 for securement to and stiffening of the spring platforms or seats 26. Wear plates 94, 96 are secured, respectively, to the sides of the spring seats and the inner faces of side walls 16 of the lower side frames 8, being slidably engageable whereby the upper side frames 24 are guided in their vertical movements by and between the side walls. It will also be noted the pairs of longitudinally spaced links 64 act to guide the vertical movements of the upper side frames 24, thus limiting side sway or rolling motion thereof and giving increased stability to the truck. Support of the car body on hangers suspended from the ends of the upper side frames provides a low center of gravity which, with the various motion limiting and stabilizing devices, results in a truck having the desired stability and riding qualities of a standard truck.

The invention may be modified in various respects as will occur to those skilled in the art and the exclusive use of all modifications as come within the scope of the appended claims is contemplated.

What is claimed is:

1. In a railway car truck, a wheel and axle assembly, lower side frames of channel-shaped cross section supported on the axle at opposite ends of said assembly, car body support members located in part between the side walls of said lower side frame and having sliding engagement with said side walls, resilient means interposed between and mounting said support members on said lower side frames, said lower side frame side walls limiting relative lateral movement of said support members, and car body supporting hangers pivotally carried by said support members.

2. In a railway car truck, a wheel and axle assembly, lower side frames having an upper central arched portion formed with spaced side walls, said lower side frames being supported on the axle at opposite ends of said assembly, car body support members located in part between said side walls of said lower side frame central portions, helical spring means at opposite sides of the axle interposed between and mounting said support members on said lower side frames, said lower side frame spaced side walls serving to limit relative lateral motion of said body support members, and car body supporting hangers pivotally carried by said support members.

3. In a railway car truck, a wheel and axle assembly, lower side frames supported on the axle at opposite ends of said assembly, said lower side frames being pan-shaped in cross section and having vertical side walls connected by a bottom wall, car body supporting members extending between said lower side frame side walls, spring seats fixed to said car body supporting members, spring means interposed between said spring seats and said lower side frame bottom walls resiliently mounting said supporting members on said lower side frames, said spring seats being slidably engageable with said lower side frame side walls whereby to guide the vertical movements of said car body supporting members, and car body supporting hangers pivotally suspended from the ends of said supporting members, said hangers having portions extending below the level of said axle and adapted to receive car body portions whereby to suspend a car body from said truck.

4. In a railway car truck, a wheel and axle assembly, lower side frames supported on the axle at opposite ends of said assembly, said lower side frames being channel-shaped in cross section providing vertical side walls and a bottom wall, transverse end members connecting opposite ends of said lower side frames, arched car body support members located at least in part between said lower side frame side walls, resilient means interposed between said lower side frame bottom walls and said car body support members and mounting the latter on said lower side frames, brackets fixed to said support members, longitudinally spaced laterally extending link means pivotally connected between said transverse end members and said brackets for guiding vertical movement and restraining lateral movement of said car body support members, and car body supporting hangers pivotally carried at the ends of said supporting members.

5. In a railway car truck, the combination with a wheel and axle assembly and a journal bearing assembly mounted at each end of said axle, of a lower side frame mounted on each bearing assembly, said lower side frame comprising spaced side walls and a bottom wall joining said side walls, an end member extending laterally between corresponding ends of said lower side frames at each end of the latter and rigidly connected thereto, a car body support member located between said side walls and having sliding engagement therewith, resilient means located between said lower side frames and said car body support members and resiliently mounting the latter on the former, each said body support member having a laterally extending link pivotally connected to each of its ends, said links further being pivotally connected to the respective adjacent end member and guiding vertical sliding motion of said body support members relative to said lower side frames, said links further stabilizing lateral movement of said body support members relative to said lower side frames, and a car body carrying hanger pivotally suspended from each end of each car body support member.

6. In a railway car having a car body and a truck supporting at least a portion of said body, the combination with a wheel and axle assembly and a journal bearing assembly mounted at each end of said axle, of a lower side frame mounted on each bearing assembly, said lower side frame comprising spaced side walls and a bottom wall joining said side walls, an end member extending laterally between corresponding ends of said lower side frames at each end of the latter and rigidly connected thereto, a car body support member located between said side walls and having sliding engagement therewith, resilient means located between said lower side frames and said car body support members and resiliently mounting the latter on the former, each said body support member having a laterally extending link pivotally connected to each of its ends, said links further being pivotally connected to the respective adjacent end member and guiding vertical sliding motion of said body support members relative to said lower side frames, said links further stabilizing lateral movement of said body support members relative to said lower side frames, and a car body carrying hanger pivotally suspended from each end of each car body support member, said hangers extending below the level of said axle for pivotal connection to the car body.

7. In a railway car having a car body and a truck supporting at least a portion of said body, the combination with a wheel and axle assembly and a journal bearing assembly mounted at each end of said axle, of a lower side frame mounted on each bearing assembly, said lower side frame comprising spaced side walls and a bottom wall joining said side walls, an end member extending laterally between corresponding ends of said lower side frames at each end of the latter and rigidly connected thereto, a car body support member located between said side walls and having sliding engagement therewith, resilient means located between said lower side frames and said car body support members and resiliently mounting the latter on the former, each said body support member having a laterally extending link pivotally connected to each of its ends, said links further being pivotally connected to the respective adjacent end member and guiding vertical sliding motion of said body support members relative to said lower side frames, said links further stabilizing lateral movement of said body support members relative to said lower side frames, and a car body carrying hanger pivotally suspended from each end of each car body support member, said hangers extending below the level of said axle for pivotal connection to the car body.

References Cited in the file of this patent

UNITED STATES PATENTS

| | | |
|---|---|---|
| 1,348,991 | Gilpin | Aug. 10, 1920 |
| 2,614,508 | Archambault | Oct. 21, 1952 |
| 2,685,846 | Gassner et al. | Aug. 10, 1954 |

FOREIGN PATENTS

| | | |
|---|---|---|
| 1,126,807 | France | July 30, 1956 |